United States Patent
Ackermann et al.

(10) Patent No.: US 10,572,597 B2
(45) Date of Patent: Feb. 25, 2020

(54) RESOLUTION OF ACRONYMS IN QUESTION ANSWERING SYSTEMS

(71) Applicant: INTERNATIONAL BUSINESS MACHINES CORPORATION, Armonk, NY (US)

(72) Inventors: Christopher F. Ackermann, Fairfax, VA (US); Charles E. Beller, Baltimore, MD (US); Stephen A. Boxwell, Franklin, OH (US); Edward G. Katz, Washington, DC (US); Kristen M. Summers, Takoma Park, MD (US)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 15/826,834

(22) Filed: Nov. 30, 2017

(65) Prior Publication Data

US 2019/0163740 A1 May 30, 2019

(51) Int. Cl.
*G06F 17/27* (2006.01)
(52) U.S. Cl.
CPC ...... *G06F 17/2785* (2013.01); *G06F 17/2705* (2013.01); *G06F 17/276* (2013.01); *G06F 17/2765* (2013.01); *G06F 17/2795* (2013.01)
(58) Field of Classification Search
USPC ...................................................... 704/7–10
See application file for complete search history.

(56) References Cited

U.S. PATENT DOCUMENTS

| | | | |
|---|---|---|---|
| 7,730,079 B2* | 6/2010 | Meijer | G06F 16/332 707/760 |
| 8,171,403 B2 | 5/2012 | Flint et al. | |
| 8,364,470 B2 | 1/2013 | Abraham et al. | |
| 8,589,370 B2* | 11/2013 | Feng | G06F 17/277 707/705 |
| 9,031,832 B2 | 5/2015 | Boguraev et al. | |
| 9,141,605 B2 | 9/2015 | Boyle et al. | |

(Continued)

OTHER PUBLICATIONS

Mell et al., "The NIST Definition of Cloud Computing," National Institute of Standards and Technology, Sep. 2011, pg. 1-3, Special Publication 800-145.

(Continued)

*Primary Examiner* — Leonard Saint Cyr
(74) *Attorney, Agent, or Firm* — Robert D. Bean (57) ABSTRACT

According to one embodiment, a method, computer system, and computer program product for acronym resolution is provided. The present invention may include receiving documents; identifying explicit expansions within the documents; receiving an input from a user; retrieving passages relevant to the received input from the documents; for each acronym within the one or more relevant passages, determining whether the acronym corresponds with explicit expansions within the relevant passages; for each of the acronyms that do not correspond with explicit expansions, determining whether the acronym corresponds with implicit expansions within the relevant passages; and for each of the acronyms that do not correspond with implicit expansions, determining whether the acronym corresponds with acronyms within a universal acronym list, and transmitting the one or more resolved acronyms to a question answering system.

20 Claims, 5 Drawing Sheets

(56) References Cited

U.S. PATENT DOCUMENTS

| | | |
|---|---|---|
| 9,311,286 B2 | 4/2016 | Bank et al. |
| 9,336,192 B1 | 5/2016 | Barba et al. |
| 2009/0144260 A1* | 6/2009 | Bennett ............... G06F 16/9537 |
| 2012/0109974 A1* | 5/2012 | Feng ................... G06F 17/2247 |
| | | 707/748 |
| 2014/0158040 A1 | 6/2014 | Reichlin |
| 2015/0242493 A1* | 8/2015 | Misra .................. G06F 16/3325 |
| | | 707/727 |
| 2016/0224524 A1* | 8/2016 | Kay ....................... G06F 16/252 |
| 2017/0199963 A1* | 7/2017 | Kondadadi ........... G06F 19/328 |

OTHER PUBLICATIONS

Anonymous, "Context-Based Concept Resolution with Structured and Unstructured Sources", An IP.com Prior Art Database Technical Disclosure, IP.com No. IPCOM000246223D, IP.com Electronic Publication Date: May 17, 2016, pp. 1-7.

Anonymous, "Question Formation Enhancement", An IP.com Prior Art Database Technical Disclosure, IP.com No. IPCOM000223766D, IP.com Electronic Publication Date: Nov. 28, 2012, pp. 1-2.

Nadeau et al., "A Supervised Learning Approach to Acronym Identification", AI 2005, LNAI 3501, pp. 319-329, 2005.

Wong et al., "Practical Approach to Knowledge-Based Question Answering With Natural Language Understanding and Advanced Reasoning", Thesis, Jun. 2005, pp. 1-166.

\* cited by examiner

RESOLUTION OF ACRONYMS IN QUESTION ANSWERING SYSTEMS

STATEMENT REGARDING FEDERALLY SPONSORED RESEARCH OR DEVELOPMENT

This invention was made with government support. The government has certain rights to this invention.

BACKGROUND

The present invention relates, generally, to the field of computing, and more particularly to natural language processing.

Natural language processing is a field of computing concerned with in-context interactions between computers and humans using natural languages. As computing power has become cheaper, faster, and more powerful, many companies are rushing to develop personal assistants capable of communicating with humans using natural language for phones, tablets, computer operating systems and even purpose-built home automation appliances to provide intuitive machine-man interfacing. As such, the field of natural language processing has massively grown in relevance in recent years, and streamlining the process is of immense commercial importance. A primary goal of the field is to enable computers to process and reply to user questions or comments in a natural fashion. Achieving this goal requires that computers be able to parse the remark and return a reply that is contextually relevant, and one important component of interpreting the context of a remark is identifying the words and phrases represented by acronyms. Acronyms are common literary devices in natural language, and must be correctly resolved in order to enable accurate natural language interactions between computers and humans.

SUMMARY

According to one embodiment, a method, computer system, and computer program product for acronym resolution is provided. The present invention may include receiving documents; identifying explicit expansions within the documents; receiving an input from a user; retrieving passages relevant to the received input from the documents; for each acronym within the one or more relevant passages, determining whether the acronym corresponds with explicit expansions within the relevant passages; for each of the acronyms that do not correspond with explicit expansions, determining whether the acronym corresponds with implicit expansions within the relevant passages; and for each of the acronyms that do not correspond with implicit expansions, determining whether the acronym corresponds with acronyms within a universal acronym list, and transmitting the one or more resolved acronyms to a question answering system.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to natural language processing. The following described exemplary embodiments provide a system, method, and program product to, among other things, implement a cascading three-tier process of acronym disambiguation that applies multiple methods of acronym resolution in order of effectiveness to resolve user queries with passages that contain acronyms. Therefore, the present embodiment has the capacity to improve the technical field of natural language processing by consistently and reliably identifying acronyms within documents searched to provide responses to user queries, and thereby improving computer processing of acronyms and leading to more natural and efficient human-machine interactions.

As previously described, natural language processing is a field of computing concerned with in-context interactions between computers and humans using natural languages. As computing power has become cheaper, faster, and more powerful, many companies are rushing to develop personal assistants capable of communicating with humans using natural language for phones, tablets, computer operating systems and even purpose-built home automation appliances to provide intuitive machine-man interfacing. As such, the field of natural language processing has massively grown in relevance in recent years, and streamlining the process is of immense commercial importance. A primary goal of the field is to enable computers to process and reply to user questions or comments in a natural fashion. Achieving this goal requires that computers be able to parse the remark and return a reply that is contextually relevant, and one important component of interpreting the context of a remark is identifying the words and phrases represented by acronyms. Acronyms are common literary devices in natural language, and must be correctly resolved in order to enable accurate natural language interactions between computers and humans.

In a question-answering task between a human user and a computer, it is common for the user to ask questions including phrases that are represented as acronyms in source documents. This poses a challenge in that many acronyms have multiple different meanings. For example, in the passage "You can withdraw from your IRA after you turn 59 and a half", a human being would be able to infer from context that the passage refers to an Individual Retirement Account, and not to Import Risk Analysis, the Islamabad Rugby Association, or any other meaning. Correctly resolving acronyms in the context of their passage is therefore very important to providing high-quality answers in a question answering system. As such, it may be advantageous to, among other things, implement a system that applies multiple different methods, in order of effectiveness, to maximize the accuracy with which a given acronym is resolved.

According to one embodiment, the invention is a cascading three-tier process of disambiguation of acronyms where first all acronyms in a document are mapped to explicit expansions elsewhere in the document and related documents. For every acronym that is not successfully mapped in this way, the acronyms are matched to likely phrases that match the acronym pattern elsewhere in the document and related documents. If there are no likely phrases that match the acronym pattern in the document or related documents, a universal list of acronyms is consulted.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to implement a cascading three-tier process of acronym disambiguation that applies multiple methods of acronym resolution in order of effectiveness.

Figure 1:
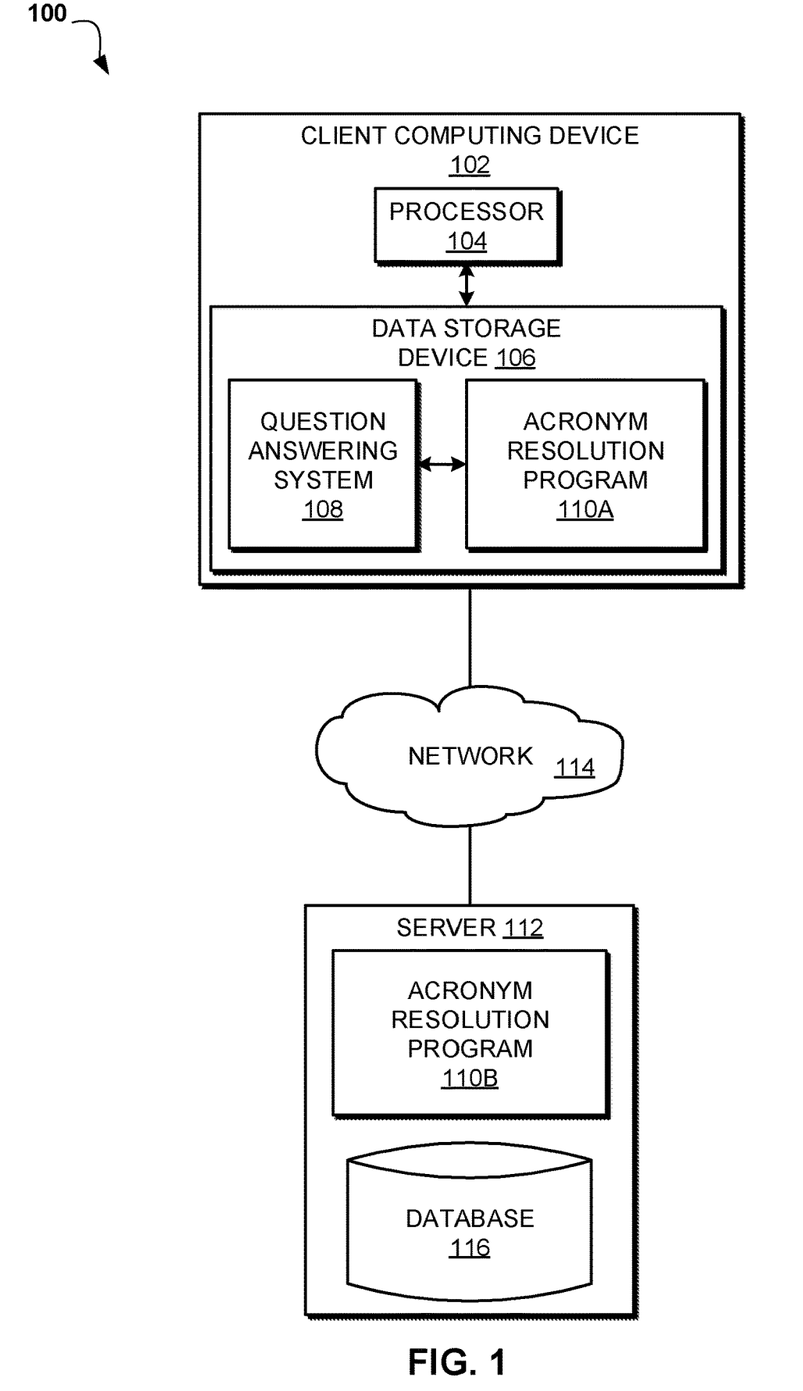
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an acronym resolution program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running an acronym resolution program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, question answering system 108 may be one of any number of software agents capable of interacting with a user by means of audible speech and providing information or performing tasks based on the voice commands of the user, and where responses are provided by consulting documents. Examples may include recent commercially successful voice-based virtual assistants, such as the Google® (Google® and all Google®-based trademarks and logos are trademarks or registered trademarks of Google Inc. and/or its affiliates) search engine, IBM Watson® (IBM Watson® and all IBM Watson®-based trademarks and logos are trademarks or registered trademarks of International Business Machines Corporation, and/or its affiliates), and START Natural Language Question Answering System, or the YodaQA open source question answering system. Question answering system 108 need not necessarily be located on client computing device 102; question answering system 108 may be located anywhere within communication of the acronym resolution program 110A, 110B, such as on server 112 or on any other device located within network 114. Furthermore, question answering system 108 may be distributed in its operation over multiple devices, such as client computing device 102 and server 112. In an alternate embodiment, question answering system 108 may be an app or program distinct from, but in communication with, a voice-based virtual assistant.

According to the present embodiment, the acronym resolution program 110A, 110B may be a program capable of implementing a cascading three-tier process of acronym disambiguation that applies multiple methods of acronym resolution in order of effectiveness. The acronym resolution method is explained in further detail below with respect to FIG. 2. The acronym resolution program 110A, 110B may be a discrete program or a subroutine or method integrated into question answering system 108. The acronym resolution program 110A, 110B may be located on client computing device 102 or server 112 or on any other device located within network 114. Furthermore, acronym resolution program 110A, 110B may be distributed in its operation over multiple devices, such as client computing device 102 and server 112.

Figure 2:
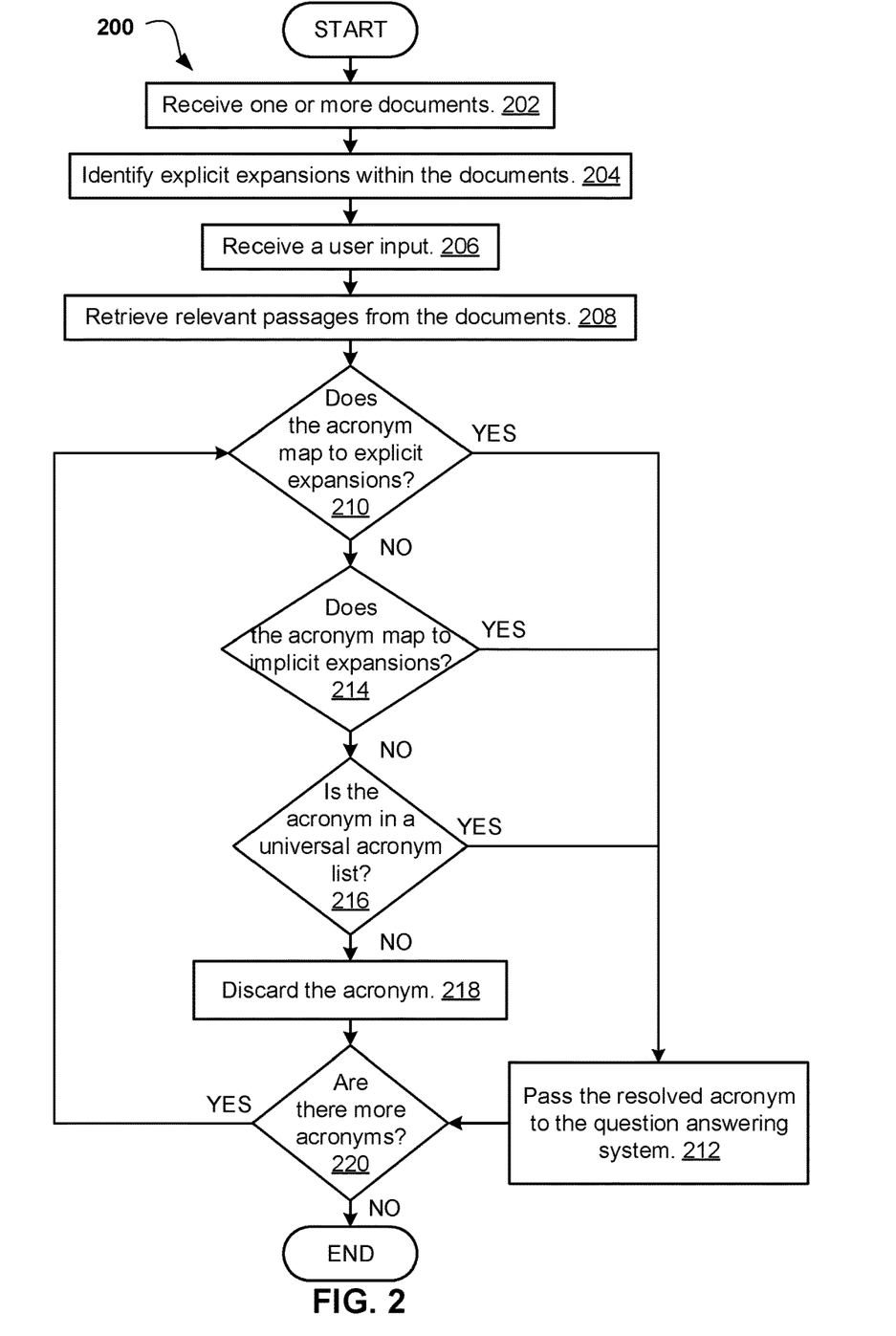
FIG. 2 is an operational flowchart illustrating an acronym resolution process according to at least one embodiment.

Referring now to FIG. 2, an operational flowchart illustrating an acronym resolution process 200 is depicted according to at least one embodiment. At 202, the acronym resolution program 110A, 110B receives one or more documents. The documents may be in any natural language format and may be preprocessed or may still be in a raw natural language state. The documents may contain any content that might be useful in formulating a response to a user input, such as research papers, newspapers, letters, encyclopedias, et cetera. These documents may be received from question answering system 108, or may be received from any data repository on client computing device 102 or server 112 or on any other device located within network 114, such as data storage device 106 or database 116. The documents may contain acronyms, and may be sent to acronym resolution program 110A, 110B from question answering system 108 if question answering system 108 is unable to resolve the acronyms within the documents.

Then, at 204, acronym resolution program 110A, 110B identifies explicit expansions within the documents. This may be a language processing task, where words containing multiple capital letters or letters separated by periods are flagged if they correspond with an acronym elsewhere in the document. Expansions are phrases, each word of which corresponds with a letter of an acronym. Explicit expansions may be identified in the document, where explicit expansions are language within the document that specifically identifies the expansion of a given acronym within the document. For instance, if the acronym "IRA" appears in a document, it may be flagged as an acronym, and if "IRA" is preceded by "individual retirement account," then "individual retirement account" may be flagged as the explicit expansion for "IRA." If no explicit expansions are located within the document, acronym resolution program 110A, 110B may further search a document for phrases containing the letters of the acronym and flag them as implicit expansions.

Next, at 206, acronym resolution program 110A, 110B receives a user input. The user input may be a natural language query or command in the form of text or speech. The user input may be received from question answering system 108, or may be received from any data repository on client computing device 102 or server 112 or on any other device located within network 114, such as data storage device 106 or database 116.

Then, at 208, acronym resolution program 110A, 110B retrieves relevant passages from the documents. The passages may be relevant to answering the user input, and may be considered relevant through any number of means, such as sharing words or phrases with the input, containing a phrase from the input in the title, et cetera. The acronym resolution program 110A, 110B may use any document search or word processing program to evaluate passages for relevance. Any passages that are considered relevant are retrieved. In some embodiments, retrieval may entail moving the passages from the documents to another location, file or data repository. In other embodiments, retrieval may entail flagging passages as relevant, or appending metadata to documents containing relevant passages, where the metadata specifies the location of the relevant passages. The acronym resolution program 110A, 110B may also retrieve relevant documents.

Next, at 210, the acronym resolution program 110A, 110B determines whether the acronym maps to explicit expansions. In this step, acronym resolution program 110A, 110B searches the relevant passages taken from the source document or documents for an explicit expansion of an acronym appearing in the passage. An explicit expansion can be associated with its acronym by being spelled out grammatically; for instance "IBM refers to International Business Machines, a company based in Armonk N.Y.", or can be in a parenthetical: "International Business Machines (IBM) is based in Armonk N.Y." In these cases, the acronym disambiguation is assumed to be high-quality, as the document is unlikely to use IBM to refer to, for instance, the International Brotherhood of Magicians, in the same document without explanation. As a further example, a user input may be "How long is the Izu-Bonin-Mariana arc system?" The acronym resolution program 110A, 110B may, in response, search the following passage: "The Izu-Bonin-Mariana (IBM) arc system is a tectonic-plate convergent boundary. IBM extends over 2800 km south from Tokyo, Japan, to beyond Guam, and includes the Izu Islands, Bonin Islands, and Mariana Islands." In this example, the beginning of the source document specifies that the letters "IBM stand for "Izu-Bonin-Mariana." From this, acronym resolution program 110A, 110B may deduce that "IBM" in the second sentence refers to the geographic area, and not the technology company headquartered in Armonk, N.Y. In this case, acronym resolution program 110A, 110B identifies the phrase before the parenthetical in the first sentence as the correct resolution of "IBM." According to one implementation, if the acronym resolution program 110A, 110B determines that the acronym does map to an explicit expansion (step 208, "YES" branch), the acronym resolution program 110A, 110B may continue to step 210 to pass the resolved acronym to the question answering system. If the acronym resolution program 110A, 110B determines that the acronym does not map to an explicit expansion (step 208, "NO" branch), the acronym resolution program 110A, 110B may continue to step 212 to determine whether the acronym maps to implicit expansions.

Then, at 212, acronym resolution program 110A, 110B passes the resolved acronym to the question answering system. An acronym may be resolved when one or more acronyms in relevant passages have been identified to correspond or potentially correspond with an expansion, or when one or more expansions in relevant passages have been located for an acronym. Depending on what method was used to resolve the acronym, a resolved acronym may vary in accuracy, as well as in number of expansions attributed to a single acronym. For instance, if an acronym is resolved by identifying an explicit expansion in the documents, it is likely that only one expansion will be assigned to the acronym, and it is highly likely to be accurate. Conversely, if acronym resolution program 110A, 110B must resort to the universal acronym list, an acronym may be assigned to all expansions commonly associated with that acronym that are listed in the universal acronym list, which are less likely to be correct. However, the acronym and all its expansions may be passed to the question answering system. In an alternate embodiment, a confidence score may be assigned to the resolved acronym, or to each expansion of a resolved acronym, to represent the likelihood that each expansion is relevant. This confidence score may be based on the method used to resolve the algorithm, or may take into account the contextual relevance of each expansion based on the input.

Next, at 214, the acronym resolution program 110A, 110B determines whether the acronym matches implicit expansions in the documents. In this step, acronym resolution program 110A, 110B searches the source document implicit expansions, which are noun phrases that match the acronym in question, or acronyms that match the first letters of the named entity in question. For example, if a document group references International Business Machines, then later refers to IBM, acronym resolution program 110A, 110B may match these two references by matching their capital letters. These disambiguations may be considered less reliable than the explicit ones. As an example, a user input may be "What Kingston Trio song describes a man's mishaps aboard a Metropolitan Transit Authority subway car?" The acronym resolution program 110A, 110B may search the following passage among the documents provided to it: "the song "M.T.A."'s lyrics tell an absurd tale of a man named Charlie, trapped in Boston's subway system, until 1964 known as the Metropolitan Transit Authority. The song's lyrics tell of Charlie, a man who boards an MTA subway car, but then cannot get off because he does not have enough money." In this case, there is no explicit equivalence for the meaning of "MTA," but a human reader has no difficulty identifying the relationship between the acronym and the capitalized phrase at the end of the first sentence. This relationship is identified by acronym resolution program 110A, 110B in this step 212 by locating phrases with the same capital-letter sequence as the candidate acronym in a way similar to how a human would. In this case, a human reader would not match questions about, say, the Metrolina Theater Association, the Mormon Transhumanist Association, or any other MTA acronyms.

In some embodiments of the invention, this step may further include acronym resolution program 110A, 110B conducting a secondary search on named entities within passages where a query contains a named entity that could be an expansion, and a document contains acronyms that match the capital letter sequence, but do not contain the named entity from the query. For instance, in the case of a user query "What is an individual retirement account?" A passaged searched may read "An IRA is an investing tool used by individuals to earn and earmark funds for retirement savings. There are several types of IRAs as of 2016: Traditional IRAs, Roth IRAs, SIMPLE IRAs and SEP IRAs. Sometimes referred to as individual retirement arrangements, IRAs can consist of a range of financial products such as stocks, bonds or mutual funds." Unfortunately, this passage does not contain the phrase "Individual Retirement Account." However, it does contain numerous clues that the passage is talking about finances rather than politics ("individual retirement," "retirement savings," "financial," et cetera). In this case, acronym resolution program 110A, 110B may perform a secondary search on all named entities in the passage. The acronym resolution program 110A, 110B may do this by calling up introductory paragraphs from a database, or query a search index for this term. In this case, the introductory paragraph on the 'individual retirement arrangement' may contain the following information: "An individual retirement arrangement, also known as an individual retirement account (IRA) is a tax-favored personal savings arrangement, which allows you to set aside money for retirement." In this case, following a link to a named entity in the passage yields a helpful passage. In this case, "IRA" is correctly resolved to "Individual Retirement Account." According to one implementation, if the acronym resolution program 110A, 110B determines that the acronym does match to likely phrases that match the acronym pattern in the documents (step 212, "YES" branch), the acronym resolution program 110A, 110B may continue to step 210 to pass the resolved acronym to the question answering system. If the acronym resolution program 110A, 110B determines that the acronym does not match to likely phrases that match the acronym pattern in the documents (step 212, "NO" branch), the acronym resolution program 110A, 110B may continue to step 214 to determine whether the acronym can be found in a universal acronym list.

Then, at 216, the acronym resolution program 110A, 110B determines whether the acronym is in a universal acronym list. The universal acronym list may be a list of acronyms, as well as common expansions for each acronym. The universal acronym list may be provided to acronym resolution program 110A, 110B, either by a user or digital entity, crawled by acronym resolution program 110A, 110B from a data repository, or assembled by acronym resolution program 110A, 110B from resolved acronyms from steps 208 or 212. The universal acronym list may also be supplemented with resolved acronyms from steps 208 or 212. According to one implementation, if the acronym resolution program 110A, 110B determines that the acronym can be found in a universal acronym list (step 214, "YES" branch), the acronym resolution program 110A, 110B may continue to step 210 to pass the resolved acronym to the question answering system. If the acronym resolution program 110A, 110B determines that the acronym cannot be found in a universal acronym list (step 214, "NO" branch), the acronym resolution program 110A, 110B may continue to step 218 to discard the acronym.

Then, at 216, acronym resolution program 110A, 110B discards the acronym. If the acronym does not map to any explicit expansions, does not match to any likely phrases that match the acronym pattern in the documents, and cannot be found in a universal acronym list, then acronym resolution program 110A, 110B must conclude that it cannot resolve the acronym in question and may discard it, either by deleting it from the corpus of received interactions, by marking it either by metadata or location, or any other method.

Next, at 218, the acronym resolution program 110A, 110B determines whether there are any more acronyms. The acronym resolution program 110A, 110B, in this step, may determine whether any acronyms remain to be resolved within the relevant passages. The acronym resolution program 110A, 110B may determine this simply by accessing the corpus of relevant passages and checking for any acronyms or expansions therein that have not been processed. Acronyms and expansions may be identified as processed by being marked with metadata at the time of their processing, may be moved to a different location, or may be marked in some other fashion. According to one implementation, if the acronym resolution program 110A, 110B determines that there are more acronyms to process within the passage or passages (step 218, "YES" branch), the acronym resolution program 110A, 110B may continue to step 208 to determine, for each acronym, whether the acronym maps to explicit expansions. If the acronym resolution program 110A, 110B determines that the acronym cannot be found in a universal acronym list (step 214, "NO" branch), the acronym resolution program 110A, 110B may terminate.

It may be appreciated that FIG. 2 provides only an illustration of one implementation and does not imply any limitations with regard to how different embodiments may be implemented. Many modifications to the depicted environments may be made based on design and implementation requirements.

Figure 3:
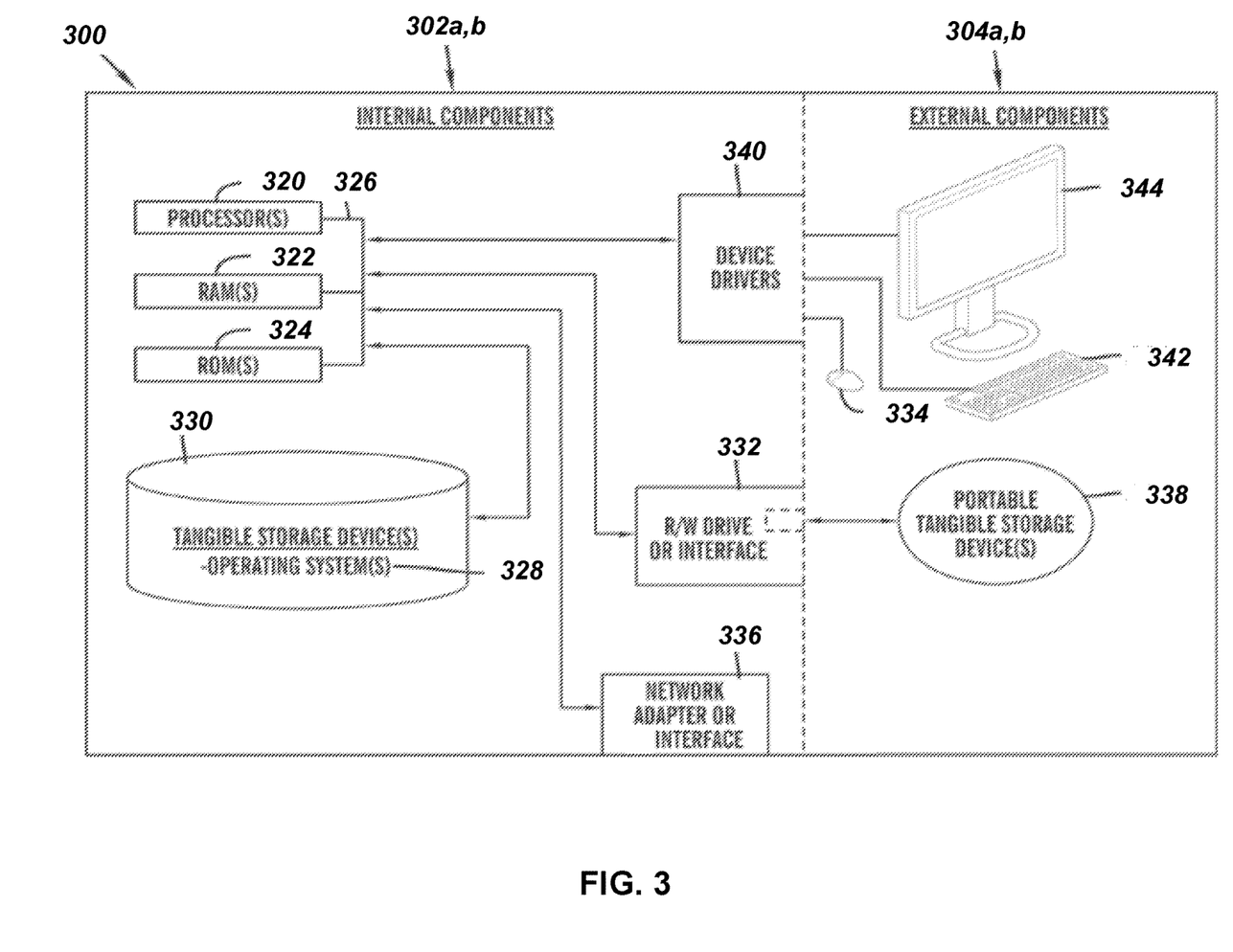
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 *a,b* and external components 304 *a,b* illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the acronym resolution program 110A in the client computing device 102, and the acronym resolution program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the acronym resolution program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The software program 108 and the acronym resolution program 110A in the client computing device 102 and the acronym resolution program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the acronym resolution program 110A in the client computing device 102 and the acronym resolution program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
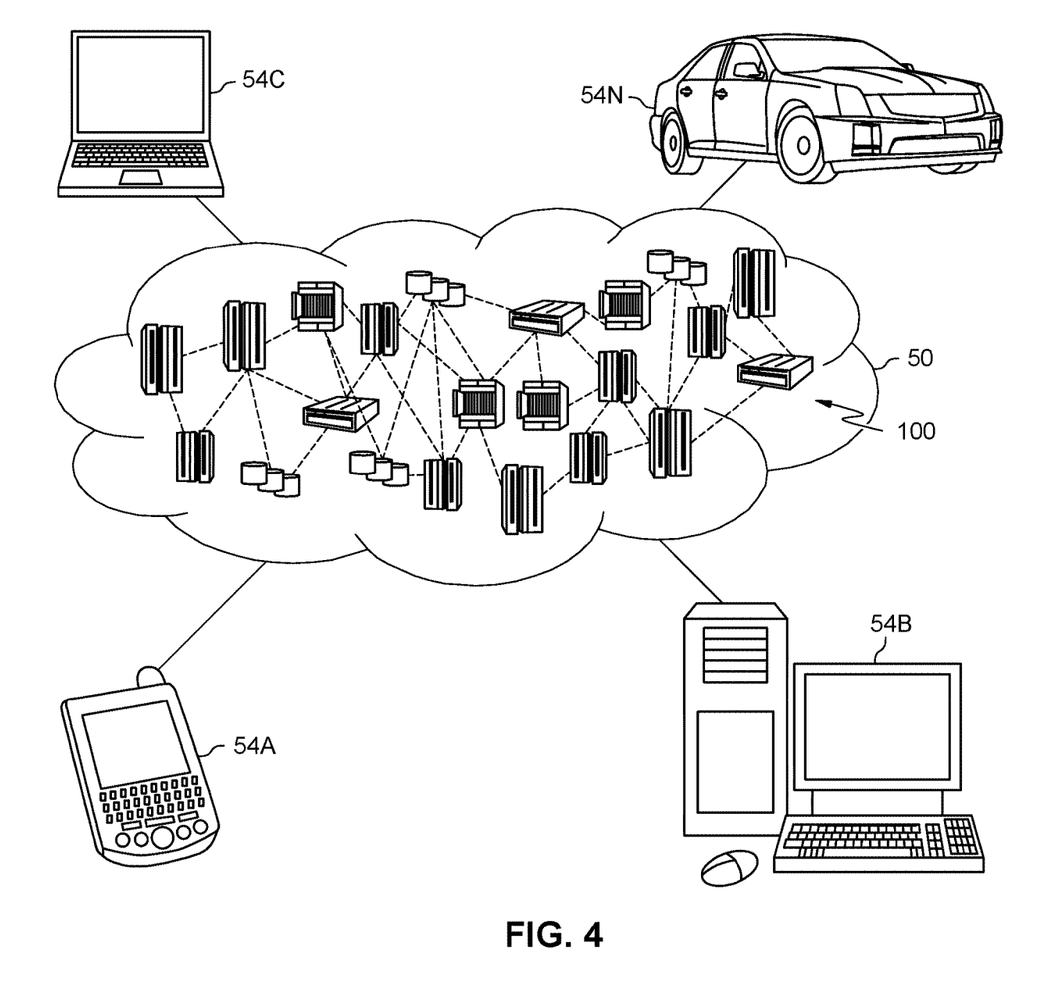
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
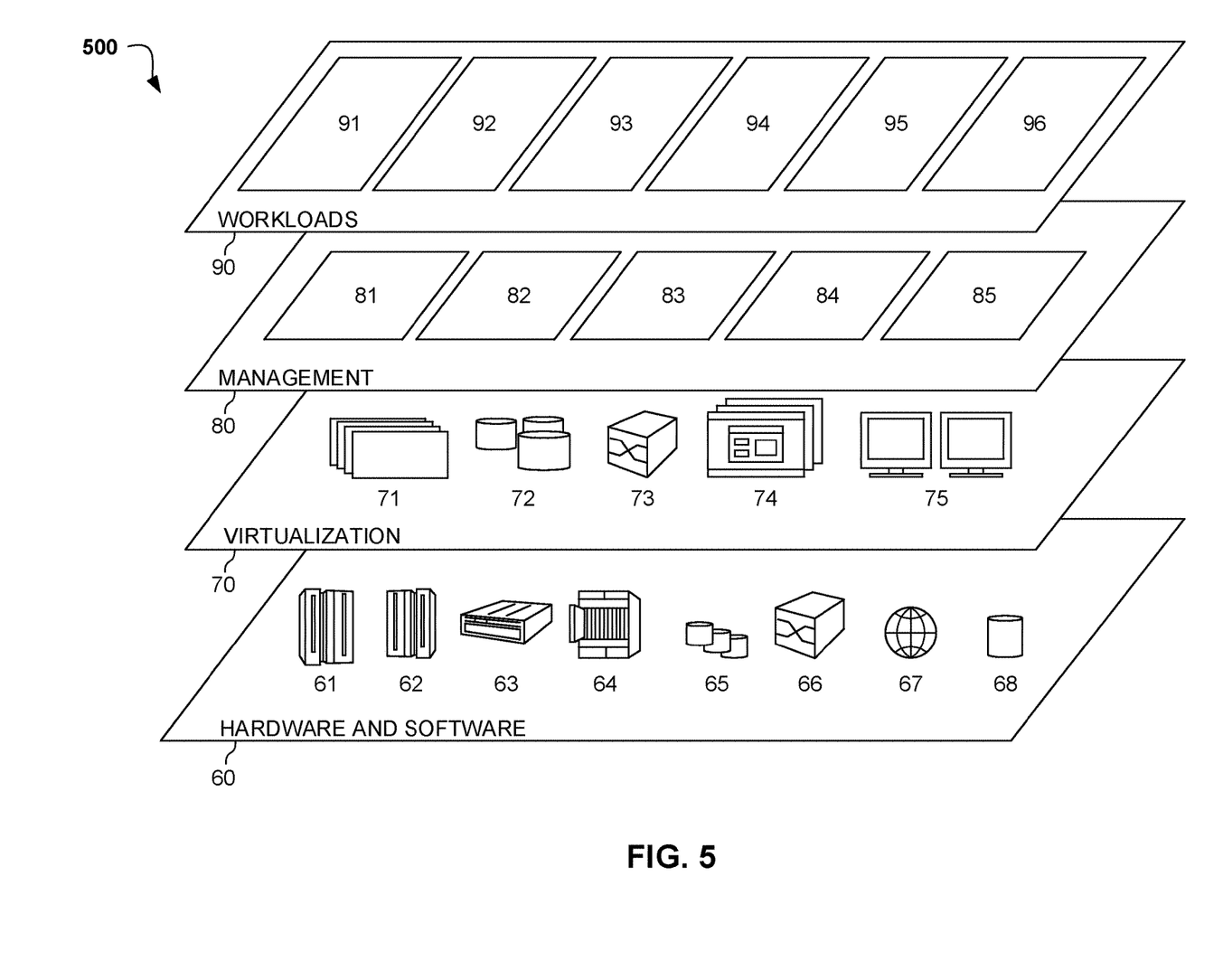
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and acronym resolution 96. Acronym resolution 96 may relate to implementing a cascading three-tier process of acronym disambiguation that applies multiple methods of acronym resolution in order of effectiveness.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for resolving acronyms in question answering systems, the method comprising:

receiving, by a processor, one or more documents;

identifying, by a processor, one or more acronyms and one or more explicit expansions within the one or more documents, wherein at least one of the explicit expansions comprises a phrase within the one or more documents comprising a plurality of capital letters matching with a plurality of letters of one of the one or more acronyms, and wherein the phrase is linked to the acronym based on context or parentheticals;

receiving, by a processor, an input from a user;

retrieving, by a processor, one or more passages relevant to the received input from the one or more documents;

for each of one or more acronyms within the one or more relevant passages, determining, by a processor, whether the acronym corresponds with one or more explicit expansions within the one or more relevant passages;

for each of the one or more acronyms that do not correspond with one or more explicit expansions, determining, by a processor, whether the acronym corresponds with one or more implicit expansions within the one or more relevant passages, wherein at least one of the implicit expansions comprises a phrase within the one or more documents comprising a plurality of letters matching with the plurality of letters of the one or more acronyms;

for each of the one or more acronyms that do not correspond with one or more implicit expansions, determining, by a processor, whether the acronym corresponds with one or more acronyms within a universal acronym list; and transmitting, by a processor, one or more resolved acronyms to a question answering system.

2. The method of claim 1, wherein the one or more explicit expansions comprise one or more acronyms and one or more expansions which are specifically linked within the one or more documents.

3. The method of claim 1, wherein the one or more implicit expansions comprise one or more acronyms and one or more expansions which are implied to be linked within the one or more documents due to shared letters or context.

4. The method of claim 1, wherein determining whether the acronym corresponds with one or more implicit expansions within the one or more relevant passages further comprises:

conducting a secondary search of one or more data repositories or one or more search indices to locate one or more additional relevant passages to provide further context linking the acronym and one or more implicit expansions.

5. The method of claim 1, wherein each acronym, located in the one or more relevant passages or the universal acronym list, which corresponds to the input is assigned a confidence level based on a likelihood of correctness.

6. The method of claim 1, wherein the one or more documents are in an unprocessed natural language format.

7. The method of claim 1, wherein the universal acronym list is supplemented with one or more resolved acronyms.

8. A computer system for resolving acronyms in question answering systems, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving one or more documents;

identifying one or more acronyms and one or more explicit expansions within the one or more documents, wherein at least one of the explicit expansions comprises a phrase within the one or more documents comprising a plurality of capital letters matching with a plurality of letters of one of the one or more acronyms, and wherein the phrase is linked to the acronym based on context or parentheticals;

receiving an input from a user;

retrieving one or more passages relevant to the received input from the one or more documents;

for each of one or more acronyms within the one or more relevant passages, determining whether the acronym corresponds with one or more explicit expansions within the one or more relevant passages;

for each of the one or more acronyms that do not correspond with one or more explicit expansions, determining whether the acronym corresponds with one or more implicit expansions within the one or more relevant passages, wherein at least one of the implicit expansions comprises a phrase within the one or more documents comprising a plurality of letters matching with the plurality of letters of the one or more acronyms;

for each of the one or more acronyms that do not correspond with one or more implicit expansions, determining whether the acronym corresponds with one or more acronyms within a universal acronym list; and transmitting one or more resolved acronyms to a question answering system.

9. The computer system of claim 8, wherein the one or more explicit expansions comprise one or more acronyms and one or more expansions which are specifically linked within the one or more documents.

10. The computer system of claim 8, wherein the one or more implicit expansions comprise one or more acronyms and one or more expansions which are implied to be linked within the one or more documents due to shared letters or context.

11. The computer system of claim 8, wherein determining whether the acronym corresponds with one or more implicit expansions within the one or more relevant passages further comprises:

conducting a secondary search of one or more data repositories or one or more search indices to locate one or more additional relevant passages to provide further context linking the acronym and one or more implicit expansions.

12. The computer system of claim 8, wherein each acronym, located in the one or more relevant passages or the universal acronym list, which corresponds to the input is assigned a confidence level based on a likelihood of correctness.

13. The computer system of claim 8, wherein the one or more documents are in an unprocessed natural language format.

14. The computer system of claim 8, wherein the universal acronym list is supplemented with one or more resolved acronyms.

15. A computer program product for resolving acronyms in question answering systems, the computer program product comprising:

one or more computer-readable tangible storage medium and program instructions stored on at least one of the one or more tangible storage medium, the program instructions executable by a processor to cause the processor to perform a method comprising:

receiving one or more documents;

identifying one or more acronyms and one or more explicit expansions within the one or more documents, wherein at least one of the explicit expansions comprises a phrase within the one or more documents comprising a plurality of capital letters matching with a plurality of letters of one of the one or more acronyms, and wherein the phrase is linked to the acronym based on context or parentheticals;

receiving an input from a user;

retrieving one or more passages relevant to the received input from the one or more documents;

for each of one or more acronyms within the one or more relevant passages, determining whether the acronym corresponds with one or more explicit expansions within the one or more relevant passages;

for each of the one or more acronyms that do not correspond with one or more explicit expansions, determining whether the acronym corresponds with one or more implicit expansions within the one or more relevant passages, wherein at least one of the implicit expansions comprises a phrase within the one or more documents comprising a plurality of letters matching with the plurality of letters of the one or more acronyms;

for each of the one or more acronyms that do not correspond with one or more implicit expansions, determining whether the acronym corresponds with one or more acronyms within a universal acronym list; and transmitting one or more resolved acronyms to a question answering system.

16. The computer program product of claim 15, wherein the one or more explicit expansions comprise one or more acronyms and one or more expansions which are specifically linked within the one or more documents.

17. The computer program product of claim 15, wherein the one or more implicit expansions comprise one or more acronyms and one or more expansions which are implied to be linked within the one or more documents due to shared letters or context.

18. The computer program product of claim 15, wherein determining whether the acronym corresponds with one or more implicit expansions within the one or more relevant passages further comprises:

conducting a secondary search of one or more data repositories or one or more search indices to locate one or more additional relevant passages to provide further context linking the acronym and one or more implicit expansions.

19. The computer program product of claim 15, wherein each acronym, located in the one or more relevant passages or the universal acronym list, which corresponds to the input is assigned a confidence level based on a likelihood of correctness.

20. The computer program product of claim 15, wherein the one or more documents are in an unprocessed natural language format.

* * * * *